United States Patent [19]

Tanabe et al.

[11] Patent Number: 5,017,220
[45] Date of Patent: May 21, 1991

[54] METHOD FOR SMELTING REDUCTION OF NI ORE

[75] Inventors: Haruyoshi Tanabe; Katsuhiro Iwasaki; Masahiro Kawakami; Chihiro Taki; Toshio Takaoka, all of Tokyo, Japan

[73] Assignee: NKK Corporation, Tokyo, Japan

[21] Appl. No.: 473,338

[22] Filed: Feb. 1, 1990

[30] Foreign Application Priority Data

Feb. 21, 1989 [JP] Japan .................................. 1-42276

[51] Int. Cl.$^5$ .............................................. C22B 23/00
[52] U.S. Cl. ..................................... 75/629; 420/119
[58] Field of Search ...................... 75/629; 420/94, 119

[56] References Cited

U.S. PATENT DOCUMENTS

| | | | |
|---|---|---|---|
| 3,769,002 | 10/1973 | O'Neill et al. | 75/629 |
| 4,029,497 | 6/1977 | Nixon | 420/119 |
| 4,399,983 | 8/1983 | Metz | 266/176 |

FOREIGN PATENT DOCUMENTS

| | | | |
|---|---|---|---|
| 58-2215 | 4/1983 | Japan | 420/119 |
| 60-36613 | 2/1985 | Japan | |

Primary Examiner—Melvyn J. Andrews
Attorney, Agent, or Firm—Frishauf, Holtz, Goodman & Woodward

[57] ABSTRACT

A method for smelting reduction of Ni ore comprises charging Ni ore, carbonaceous material and flux into a converter type smelting reduction furnace holding molten iron therein and controlling a post-combustion ratio $[(H_2O+CO_2)/(H_2+H_2O+CO+CO_2)]$ inside the smelting reduction furnace at 0.3 or more by blowing oxygen from a top-blow oxygen lance and stirring gas from a bottom-blow tuyere arranged in the bottom of the smelting reduction furnace into the smelting reduction furnace.

A relation between a content of carbon [C] (%) in molten metal and an amount of slag produced per ton of molten metal is represented with a formula:

$$[C] \geq S(T/HMT)/3$$

16 Claims, 3 Drawing Sheets

METHOD FOR SMELTING REDUCTION OF NI ORE

BACKGROUND OF THE INVENTION

1. Field of the Invention

The present invention relates to a method for direct smelting reduction of Ni ore in a smelting reduction furnace by the use of carbonaceous material as a fuel or a reducing material.

2. Description of the Prior Arts

Materials such as scrap, ferro alloy, electrolytic Ni or the like have previously been used in melting and refining in a process of manufacturing stainless steel. Those materials are melted in an electric furnace or a converter. Cr and Ni being major components of stainless steel in the state of ferrochrome and ferronickel are charged into the electric furnace or the converter. Chromium ore and nickel ore are required to be previously reduced in the electric furnace or the like to manufacture ferrochrome and ferronickel. Expensive electric energy is used for reducing chromium ore and nickel ore. Accordingly, a method wherein ferrochrome and ferronickel are used as materials is not an economical method. In terms of the above-described circumstances, there has been proposed a method wherein Cr ore is used as a source of Cr to economically manufacture stainless steel and the Cr ore is smelted and reduced in a converter or another other smelting furnace.

On the other hand, four methods, which will be described as follows, are pointed out as methods of using inexpensive material for a source of Ni. A first method is a method wherein molten metal of FeNi is directly used in an electric furnace for a purpose of reducing a cost of melting FeNi. This method is described in the magazine "Iron and Steel" [69 (1983) 7, p.59]. A second method is a method for smelting and reducing Nickel matte in a converter which is disclosed in a Japanese Patent Publication Laid Open No. 104153/83. A third method is disclosed in a Japanese Patent Publication Laid Open No. 36613/85. In this method, material produced by mixing nickel oxide with carbonaceous material and forming a mixture thus obtained is heated and prereduced and the material prereduced is charged into a converter type reaction vessel, in which it is smelted and reduced. A fourth method is a method wherein nickel oxide is used ( Japanese Patent Publication Laid Open No. 291911/86).

In the above-mentioned citations, however, Ni ore is not directly smelted and reduced in a smelting furnace. Since Ni ore has a low content of the 2 to 3% Ni and 80% of weight of Ni ore converts to slag, a great amount of slag is produced in a smelting reduction of the Ni ore. Accordingly, in the case where molten metal having a predetermined concentration of Ni is tried a great amount of slag is produced. In the case of obtaining molten metal containing 8 wt. % Ni, for example, 2 to 3 tons of slag per ton of molten metal are produced. In connection with the production of a great amount of slag, the following problems become remarkable.

(1) Slopping is liable to be produced by a reaction of oxygen with carbonaceous material charged into the smelting reduction furnace as a reducing material or as a heat source at the step of the smelting reduction. In consequence, a stable operation becomes difficult whereby the operation becomes unstable.

(2) Equipment is greatly damaged by the slopping; and (3) The yield of Ni is decreased by the slopping.

In view of the foregoing problems, in the foregoing citations, Ni ore as a source of Ni is not directly charged into the smelting reduction furnace, but material having a content of Ni, whose percentage in the material is increased by subjecting the material to some preliminary treatment, is used.

SUMMARY OF THE INVENTION

It is an object of the present invention to provide a method for the smelting reduction of Ni ore which enables carrying out of a stable operation despite the occurrence of a great amount of slag and to overcome such difficulties as damage to equipment and machinery and a decrease of the yield of Ni due to the slopping.

To accomplish the above-mentioned objects, the present invention provides a method for smelting reduction of Ni ore comprising:

charging Ni ore, carbonaceous material and flux into a converter type smelting reduction furnace holding molten iron therein; and controlling a post-combustion ratio $[(H_2O+CO_2)/(H_2+H_2O+CO+CO_2)]$ inside said smelting reduction furnace at 0.3 or more by blowing oxygen from a top-blow oxygen lance and stirring gas from a bottom-blow tuyere arranged in the bottom of said smelting reduction furnace into said smelting reduction furnace.

The above objects and other objects and advantages of the present invention will become apparent from the detailed description which follows, taken in conjunction with the appended drawings.

DESCRIPTION OF THE PREFERRED EMBODIMENT

Ni ore generally used as a material for Ni contains about 30 wt. % metallic oxides of Fe and Ni. 2to 3 wt. % Ni is contained in Ni ore. A slag component accounts for about 70 wt. % of Ni ore other than the metallic oxides of Fe and Ni. Molten slag in a smelting reduction furnace is formed by the slag component in Ni ore and the slag component contained in the carbonaceous material, flux and the like. An amount of the molten slag corresponds to about 90% of weight of Ni ore. Accordingly, 2 to 3 tons of slag per ton of molten metal are produced in order to obtain molten metal containing about 8% Ni. Since a bulk density of slag is about 0.5 to 1.5 depending on the CO gas or $CO_2$ gas contained in slag, a volume of the slag becomes about twenty times larger than that of molten metal. When an amount of produced CO or $CO_2$ is large, slopping occurs. In consequence, a stable operation can be prevented and the yield of Ni can be decreased due to an interruption of operations, damage of equipment and an outflow of molten metal in connection with the slopping.

In view of the above-mentioned difficulties, the present inventors studied methods of preventing the slopping from being produced or limiting the occurence of the slopping. [C] in the molten metal is removed, being converted to CO gas by decarbonizing oxygen. This CO gas is converted to $CO_2$ by post-combusting oxygen. Reaction heat produced by the aforesaid decarbonization and post-combustion is a major heat source for the smelting reduction of Ni ore. Stirring of the molten metal and the slag is increased strengthened by the blowing of bottom-blow gas for stirring and an oxidation reaction of the foregoing [C] and CO is promoted. The larger the oxidation degree of an exhaust gas out of the smelting reduction furnace, the larger the amount of generated heat becomes. In connection with this, the amount of carbonaceous material to be charged into the smelting reduction furnace can be decreased. Accordingly, since the amount of CO gas and $CO_2$ gas which is one the causes of giving rise to the slopping is decreased, the frequency of the occurence of the slopping is thought to be greatly decreased.

Figure 1:
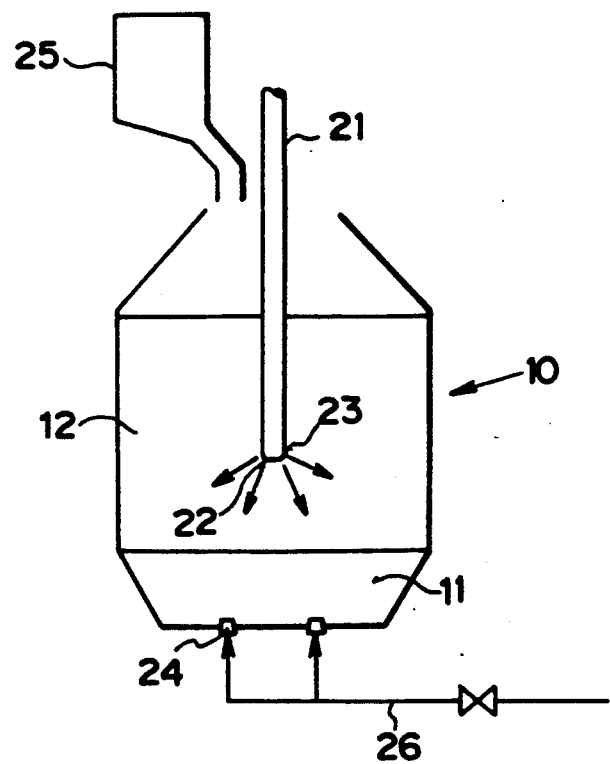
FIG. 1 is a vertical sectional view of a smelting reduction furnace used for a method of the present invention.

A preferred embodiment of the present invention will be described with specific reference to the appended drawings. FIG. 1 shows a smelting reduction furnace 10 of the preferred embodiment of the present invention. In the drawings, reference numeral 21 denotes a top-blow oxygen lance, 22 a decarbonizing nozzle, 23 a post-combustion nozzle, 24 a bottom-blow tuyere, 11 molten metal, 12 a slag layer, 25 a hopper for charging Ni ore being a material, carbonaceous material or flux into the smelting reduction furnace and 26 a pipe for feeding a stirring gas.

A method for obtaining molten metal containing a predetermined concentration of Ni by the smelting reduction of Ni ore by the use of the smelting reduction furnace constituted as described above will be described. Firstly, molten metal is charged into the smelting reduction furnace. Subsequently, carbonaceous material is charged into the smelting reduction furnace. Then, oxygen is blown from the oxygen lance 21 into the furnace. After a temperature of the molten metal has been raised to about 1500° C., Ni ore begins to be charged into the furnace. The stirring gas is blown from the tuyere 24 to prevent blockage of the tuyere by molten metal in the furnace, and the flow of the stirring gas is increased if necessary. Ni ore charged into the furnace is reduced by C in the molten metal. Heat energy for smelting Ni ore is supplied by combustion of carbon by oxygen, namely, by a reaction $C \rightarrow CO$, $CO \rightarrow CO_2$. Oxygen supplied from the decarbonizing nozzle 22 is converted to CO mainly through its reaction with [C] in the molten metal. Oxygen supplied form the post-combustion nozzle 23 reacts with said CO and converts it to $CO_2$. The ratio of post-combustion $[(H_2O + CO_2)/(H_2 + H_2O + CO + CO_2)]$ is increased.

Figure 2:
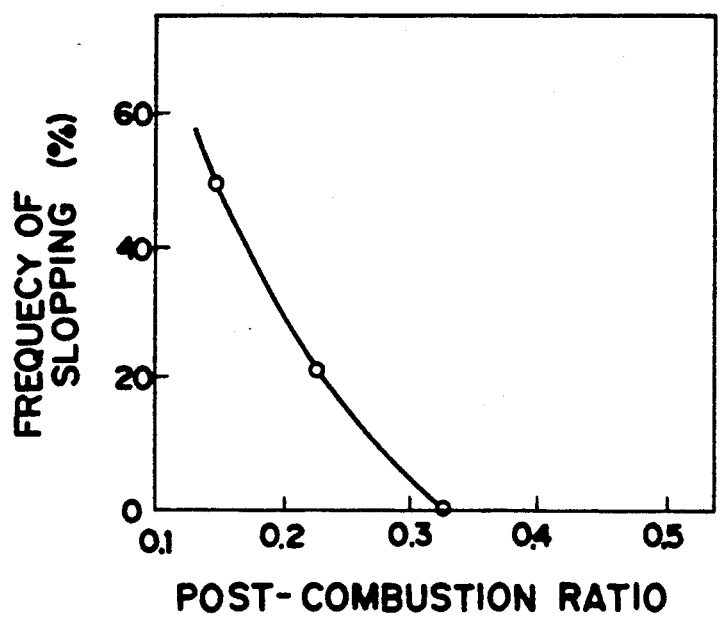
FIG. 2 is a graphical representation indicating the relation between a ratio of post-combustion and frequency of occurrence of slopping according to the present invention.
Figure 3:
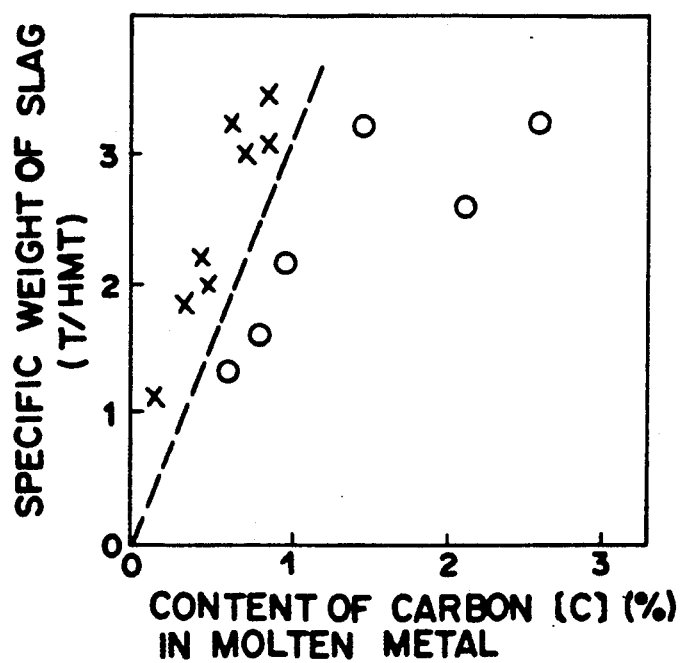
FIG. 3 is a graphical representation of the relation between a content of carbon [C] and a specific weight of slag to determine whether there is a slopping or not, according to the present invention.

FIG. 2 is a graphical representation designating the relation between the post-combustion ratio and the frequency of the occurrence of the slopping in the smelting reduction furnace. Test conditions on this occasion are 6 tons of molten metal in the smelting reduction furnace, 3 to 4% carbon [C] in the molten metal, a total amount of 2,500 $Nm^3$/Hr of oxygen which is used for decarbonizaton and for post-combustion and 1 T/HMT of specific weight of slag which is an amount of slag per tons of molten metal and represented in ton. Hereinafter, the specific weight of slag is represented with S and its unit is represented with T/HMT. As shown in FIG. 2, when the ratio of post-combustion is 0.15, the frequency of the occurrence of the slopping is increased by about 50%. When the post-combustion ratio is successively increased to more than 0.15, the frequency of the occurrence of the slopping is decreased. The post-combustion ratio is increased by lowering a position of blowing of post-combustion oxygen by elevating a position of the lance. Conversely, when the position of the lance is lowered, the post-combustion ratio is decreased. When the decarbonization oxygen is increased and the post-combustion oxygen is decreased by keeping the amount of supplied oxygen at a predetermined level, the post-combustion ratio is increased. When the decarbonization oxygen is increased and the post-combustion oxygen is decreased, the post-combustion ratio is decreased. That is, when the post-combustion oxygen is relatively increased with regard to the decarbonization oxygen, the post-combustion ratio is increased. When the ratio of post-combustion is 0.3 or more, the occurrence of the slopping is substantially not seen. The post-combustion ratio is desired to be 0.35 or more. Because the amount of produced heat is increased when the ratio of post-combustion is increased and, in connection with this, the amount of charged carbonaceous material is decreased and this leads to a decrease of occurrence of CO gas. In this connection, the amount of produced heat by post-combustion $(CO + O_2 \rightarrow CO)$ is about 2.5 times larger than the amount of heat produced by decarbonization $(C + O \rightarrow CO)$. FIG. 2 shows a result of a test conducted under conditions of 1 T/HMT of the specific weight of slag. Since it is anticipated that the occurrence of slopping is connected to carbon [C] in steel in the case the specific weight of slag is increased, a result of having studied this is shown in FIG. 3. FIG. 3 is a graphical representation wherein the relation between an amount of carbon [C] and a specific weight of slag dertermines whether there is a slopping or not. The ratio of post-combustion on this ocasion is 0.3 or more. In the drawing, ○ indicates that a stable operation is carried out without any slopping and X indicates an unstable operation with slopping. A range in which the slopping does not occur in the smelting reduction of Ni ore is shown by a boundary line drawn with a dashed line. In the graphical representation of FIG. 3, said boundary line is represented with the following relational expression of S to [C]:

$$[C](\%) = S(t/HMT)/3$$

Accordingly, a range of stable operation where slopping does not occur is shown as follows:

$$[C](\%) \geq S(t/HMT)/3$$

It is understood that the stable operation can be carried out even in a zone of $[C](\%) \geq S(t/HMT)/3$ and $[C](\%) \leq 3$. It is understood that the stable operation can be carried out in a zone of $[C](\%) \geq S(t/HMT)/3$ and $[C](\%) \leq 2$.

According to the present invention, since the post-combustion ratio is made to be 0.3 or more by blowing oxygen for decarbonization and post-combustion into the smelting reduction furnace, into which materials such as molten metal, Ni ore, carbonaceous material and the like are charged, a stable operation is carried out without any slopping and 90% or more of yield of Ni ore is secured.

EXAMPLE

Figure 4:
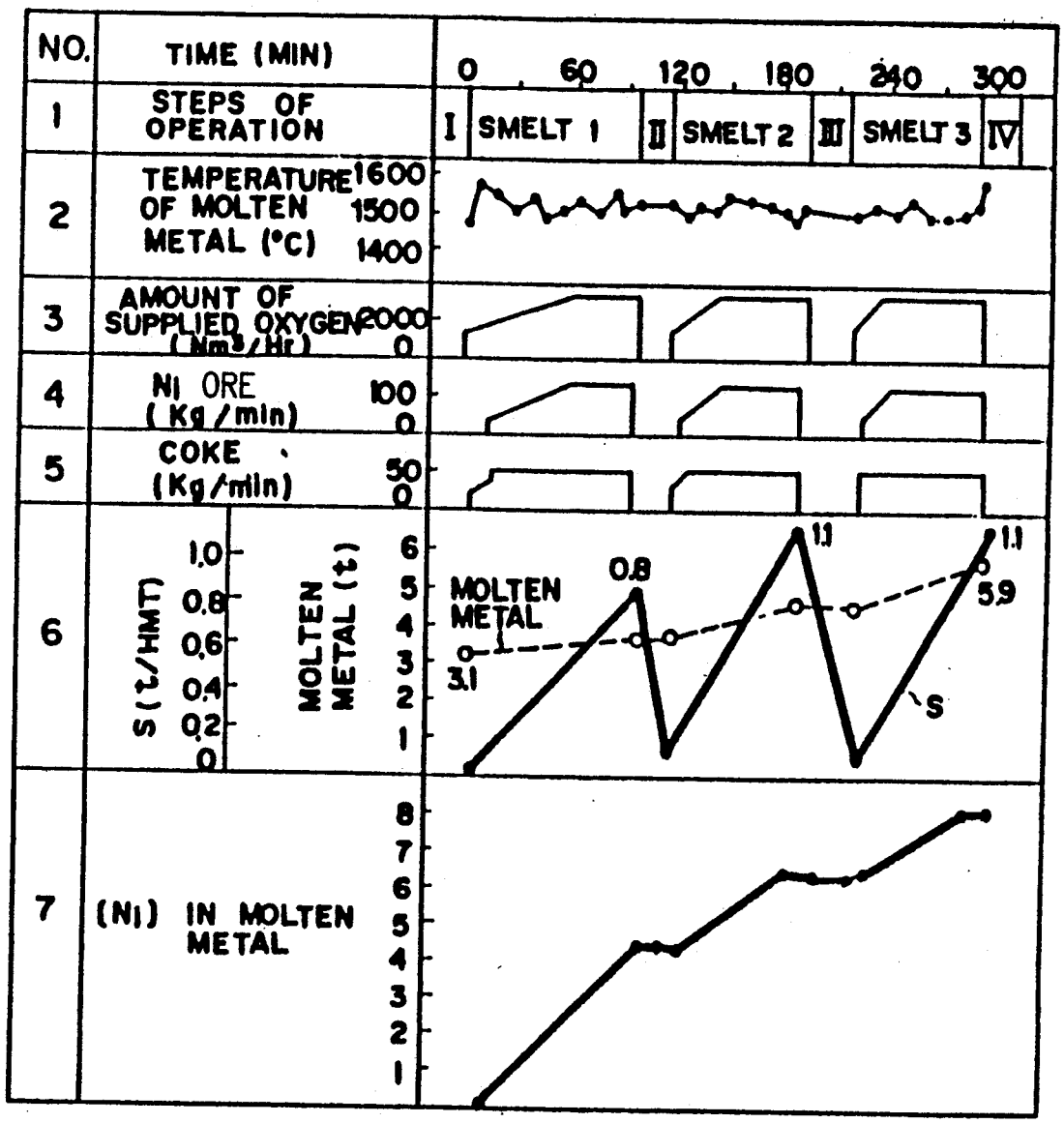
FIG. 4 is a graphical representation designating a change of operation parameters relative to time according to the example of the present invention.

A specific example of a favorable operation will be described in detail with specific reference to the appended drawings. FIG. 4 is a graphical representation showing a change of ① operation steps, ② a temperature of molten metal, ③ a total amount of supplied oxygen, ④ and ⑤ the respective amounts of Ni ore and coke being carbonaceous material, ⑥ a specific weight of slag S and molten metal (the values in the axis of the ordinate are represented in T/HMT and ton.) and ⑦ Ni component in the molten metal with the lapse of time. ① to ⑦ are figures corresponding to Nos. 1 to 7 in FIG. 4. "Smelt" 1 to 3 at the operation steps indicate the step of smelting reduction carried out three times. I designates the charge of molten metal, II to IV the discharge of slag carried out three times. The postcombustion ratio is 0.3 or more and [C] in the molten metal has a constant percentage of 3 to 4%.

At the step of operation ①, firstly, 3.1 tons of molten iron are charged into the smelting reduction furnace and, successively, a smelting reduction of Ni ore and a discharge of slag are carried out three times. The temperature ② of the molten iron metal is raised by charging coke and supplying oxygen into, the smelting reduction furnace immediately after the molten iron metal has been charged into the smelting reduction frunace. When the temperature of the molten iron metal rises and exceeds 1500° C., Ni ore is charged into the smelting reduction furnace.

Flat portions of the graphs representing the amount of supplied oxygen ③, the amount of charged Ni ore ④ and the amount of charged coke ⑤ are 2900 Nm³/Hr, 120 kg/min and 50 kg/min, respectively.

The specific weight of slag S is 0.8 to 1.1 T/HMT at its peak as shown in FIG. 4 although the specific weight of slag is naturally decreased each time the slag is discharged. The amount of molten metal in the smelting reduction furnace is increased from an initial 3.1 tons to a final 5.9 tons since Ni or Fe is added to the molten metal, Ni ore being smelted and reduced. Relative to the Ni component ⑦ in the molten metal, a molten metal having a high content of 4.5% Ni was obtained on the occasion of a first discharge of slag and a content of Ni was increased to 8.15% by a third charge of Ni ore into the smelting reduction furnace.

What is claimed is:

1. A method for a smelting reduction of Ni ore comprising:
    providing a molten metal comprising iron into a converter smelting reduction furnace,
    charging a Ni ore, a carbonaceous material and a flux into said converter smelting reduction furnace;
    smelting and reducing the Ni ore by blowing oxygen through a top blow oxygen lance, thereby forming slag and providing Ni and carbon in said molten metal;
    controlling post-combustion inside the converter smelting reduction furnace to provide a post-combustion ratio of at least 0.3 by blowing oxygen through the top flow oxygen lance and blowing a stirring gas into said converter smelting reduction furnace through at least one bottom blow tuyere disposed in the bottom of said converter smelting reduction furnace, said postcombustion ratio being determined by the formula of $(H_2O+CO_2)/(H_2+H_2O+CO+CO_2)$, wherein said $H_2$, $CO$, $CO_2$ and $H_2O$ are gases produced after said post-combustion is performed; and
    controlling the relationship between the carbon content in said molten metal containing Ni and the amount of the slag to satisfy the formula of $C \geqq Sl/3$, where C is the wt. % of the carbon in said molten metal containing Ni, and Sl is the amount of the slag produced per ton of said molten metal containing Ni.

2. The method of claim 1, wherein said blowing oxygen from a top-blow oxygen lance includes blowing oxygen from a decarbonizing nozzle and a post-combustion nozzle arranged at the end of said top-blow oxygen lance.

3. The method of claim 2, wherein said oxygen blown from the decarbonization nozzle and post-combustion nozzle is relatively changed in quantity to each other.

4. The method of claim 1, wherein said charging Ni ore into the converter smelting reduction furnace is carried out after a temperature of the molten iron held in the converter smelting reduction furnace has been raised to 1500° C. or more by blowing oxygen from the top-blow oxygen lance.

5. The method of claim 1, wherein the lance is capable of being raised and lowered to change its height and said post-combustion ratio is controlled by changing the height of the top-blow oxygen lance so as to adjust the effect of the blowing of the oxygen.

6. The method of claim 1, wherein the molten metal forms a layer at the bottom of the converter smelting reduction furnace and the molten slag forms as a layer on said layer of said molten metal containing Ni.

7. The method of claim 2, wherein the blowing of oxygen from the post-combustion nozzle is increased with respect to the blowing of oxygen from the decarbonization nozzle.

8. The method of claim 1, wherein the post-combustion ratio is at least 0.35.

9. The method of claim 1, wherein $C \leqq 3$.

10. The method of claim 1, wherein $C \leqq 2$.

11. The method of claim 15, wherein the carbonaceous material is coke.

12. The method of claim 1, wherein the Ni ore comprises 30 weight % metallic oxides of Fe and Ni.

13. The method of claim 12, wherein the ore comprises 2 to 3 weight % Ni.

14. The method of claim 13, wherein a slag forming component accounts for about 70 weight % of the Ni ore rather than the metallic oxides of Fe and Ni.

15. The method of claim 1, wherein the post combustion ratio is 0.3 and C is 3 to 4%.

16. The method of claim 15, wherein Sl is 0.8 to 1.1.

* * * * *